United States Patent
Hariharan et al.

(10) Patent No.: US 6,933,034 B2
(45) Date of Patent: Aug. 23, 2005

(54) DATA STORAGE MEDIA CONTAINING TRANSPARENT POLYCARBONATE BLENDS

(75) Inventors: Ramesh Hariharan, Malden, MA (US); Gary Charles Davis, Albany, NY (US); Marc Brian Wisnudel, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 12 days.

(21) Appl. No.: 10/446,236

(22) Filed: May 29, 2003

(65) Prior Publication Data

US 2004/0024125 A1 Feb. 5, 2004

Related U.S. Application Data

(62) Division of application No. 09/858,582, filed on May 17, 2001, now Pat. No. 6,593,425.
(60) Provisional application No. 60/208,139, filed on May 31, 2000, and provisional application No. 60/294,202, filed on May 31, 2000.

(51) Int. Cl.⁷ .............................................. C08L 69/00
(52) U.S. Cl. ...................... 428/64.7; 428/412; 525/462
(58) Field of Search ................ 428/64.7, 412; 525/462

(56) References Cited

U.S. PATENT DOCUMENTS 5,278,131 A * 1/1994 Kawamura et al. ......... 503/227
5,629,117 A * 5/1997 Katsukawa et al. .......... 430/83

OTHER PUBLICATIONS

Kim, Effects of Polycarbonate Molecular Structure on the Miscibility with Other Polymers; Macromolecules vol. 25#12, Jun. 1992, pp. 3097–3105.*
Letter from TPLO Rejecting application Data Storage Media Containing Transparent Polycarbonate Blends.

* cited by examiner

*Primary Examiner*—David J. Buttner
(74) *Attorney, Agent, or Firm*—Andrew J. Caruso; William E. Powell, III

(57) ABSTRACT

The invention relates to transparent blends of polymers suitable for use in optical articles; the polymers contain residues of BCC and its derivatives, and have properties particularly suited for use in high density optical data storage media. The polymers further contain residues of other polymers, such as α-methyl polystyrene and polystyrene derivatives; bisphenols, such as bisphenol A; cycloaliphatic polyester resins, such as PCCD and its derivatives or some combination of each.

11 Claims, No Drawings

DATA STORAGE MEDIA CONTAINING TRANSPARENT POLYCARBONATE BLENDS

CROSS-REFERENCE TO RELATED APPLICATIONS

This application is a divisional of application Ser. No. 09/858,582, filed May 17, 2001, now U.S. Pat. No. 6,593,425 which claims priority from Provisional application Ser. No. 60/208,139 filed May 31, 2000 and claims benefit from provisional application Ser. No. 60/294,202 filed May 31, 2000, all of which are hereby incorporated by reference in their entirety.

BACKGROUND OF THE INVENTION

This invention relates to transparent miscible blends of polymers suitable for use in optical articles. This invention further relates to optical articles, and methods for making optical articles from the transparent blends.

In addition to use as optical articles, the blends of the invention are useful in producing transparent articles of manufacture having good properties. These properties include food chemical resistance and melt processibility. These blends are especially useful for making transparent molded articles, fibers, films and sheeting.

Polycarbonates and other polymer materials are utilized in optical data storage media, such as compact disks. In optical data storage media, it is critical that polycarbonate resins have good performance characteristics such as transparency, low water affinity, good processibility, good heat resistance, and low birefringence. High birefringence is particularly undesirable in high density optical data storage media.

Improvements in optical data storage media, including increased data storage density, are highly desirable, and achievement of such improvements is expected to improve well established and new computer technology such as read only, write once, rewritable, digital versatile, and magneto-optical (MO) disks.

In the case of CD-ROM technology, the information to be read is imprinted directly into a moldable, transparent plastic material, such as bisphenol A (BPA) polycarbonate. The information is stored in the form of shallow pits embossed in a polymer surface. The surface is sputtered with a reflective metallic film, and the digital information, represented by the position and length of the pits, is read optically with a focused low power (5 mW) laser beam.

The operating principle in a write once read many (WORM) drive is to use a focused laser beam (20–40 mW) to make a permanent mark on a thin film on a disk. The information is then read out as a change in the optical properties of the disk, e.g., reflectivity or absorbance.

Although the CD-ROM and WORM formats have been successfully developed and are well suited for particular applications, the computer industry is focusing on erasable media for optical storage (EODs). There are two types of EODs: phase change (PC) and magneto-optic (MO). In MO storage, a bit of information is stored as a ~1 μm diameter magnetic domain, which has its magnetization either up or down. The information can be read by monitoring the rotation of the plane polarization of light reflected from the surface of the magnetic film. This rotation, called the Magneto-Optic Kerr Effect (MOKE) is typically less than 0.5 degrees. The materials for MO storage are generally amorphous alloys of the rare earth and transition metals. Amorphous materials have a distinct advantage in MO storage as they do not suffer from "grain noise", spurious variations in the plane of polarization of reflected light caused by randomness in the orientation of grains in a polycrystalline film. Bits are written by heating above the Curie point, $T_c$, and cooling in the presence of a magnetic field, a process known as thermomagnetic writing. In the phase-change material, information is stored in regions that are different phases, typically amorphous and crystalline. These films are usually alloys or compounds of tellurium which can be quenched into the amorphous state by melting and rapidly cooling. The film is initially crystallized by heating it above the crystallization temperature. In most of these materials, the crystallization temperature is close to the glass transition temperature. When the film is heated with a short, high power focused laser pulse, the film can be melted and quenched to the amorphous state. The amorphized spot can represent a digital "1" or a bit of information. The information is read by scanning it with the same laser, set at a lower power, and monitoring the reflectivity.

In the case of WORM and EOD technology, the recording layer is separated from the environment by a transparent, non-interfering shielding layer. Materials selected for such "read through" optical data storage applications must have outstanding physical properties, such as moldability, ductility, a level of robustness compatible with popular use, resistance to deformation when exposed to high heat or high humidity, either alone or in combination. The materials should also interfere minimally with the passage of laser light through the medium when information is being retrieved from or added to the storage device.

As data storage densities are increased in optical data storage media to accommodate newer technologies, such as digital versatile disks (DVD), recordable and rewritable digital versatile disks (DVD-R and DVD-RW), high density digital versatile disks (HD-DVD), digital video recorders (DVR), and higher density data disks for short or long term data archives, the design requirements for the transparent plastic component of the optical data storage devices have become increasingly stringent. In many of these applications, previously employed polycarbonate materials, such as BPA polycarbonate materials, are inadequate. Materials displaying lower birefringence at current, and in the future progressively shorter "reading and writing" wavelengths have been the object of intense efforts in the field of optical data storage devices.

Low birefringence alone will not satisfy all of the design requirements for the use of a material in optical data storage media; high transparency, heat resistance, low water absorption, ductility, high purity and few inhomogeneities or particulates are also required. Currently employed materials are found to be lacking in one or more of these characteristics, and new materials are required in order to achieve higher data storage densities in optical data storage media. In addition, new materials possessing improved optical properties are anticipated to be of general utility in the production of other optical articles, such as lenses, gratings, beam splitters and the like.

In applications requiring higher storage density, the properties of low birefringence and low water absorption in the polymer material from which the optical article is fabricated become even more critical. In order to achieve higher data storage density, low birefringence is necessary so as to minimally interfere with the laser beam as it passes through the optical article, for example a compact disk.

Another critical property needed for high data storage density applications is disk flatness. The disk flatness is dependent upon the flatness of the polycarbonate substrate immediately after the injection molding process as well as the dimensional stability of the substrate upon exposure to high humidity environments. It is known that excessive moisture absorption results in disk skewing which in turn leads to reduced reliability. Since the bulk of the disk is comprised of the polymer material, the flatness of the disk depends on the low water solubility and low rate of water diffusion into the polymeric material. In addition, the polymer should be easily processed in order to product high quality disks through injection molding.

There exists a need for compositions having good optical properties and good processibility and which are suitable for use in high density optical recording media. Polycarbonates manufactured by copolymerizing the aforementioned aromatic dihydroxy compounds, such as BPA, with other monomers, such as 6,6'-dihydroxy-3,3,3',3'-tetramethylspirobiindane (SBI), may produce acceptable birefringence; however the glass transition temperature ($T_g$) melt viscosity is often too high, resulting in poor processing characteristics. Consequently, the obtained moldings have low impact resistance and low pit replication. Further, the water absorption of such polycarbonates is unacceptable for higher density applications.

BRIEF SUMMARY OF THE INVENTION

The present invention solves these problems, and provides compositions for storage media having unexpected and advantageous properties. These and further objects of the invention will be more readily appreciated by considering the following disclosure and appended claims.

The present invention, in one aspect, relates to the blending of polymers to produce transparent miscible blend compositions. In a further aspect, the applicants were surprised to discover that the transparent miscible blend compositions of the present invention possess suitable properties for use in optical articles, in particular for use in optical data storage media.

The present invention relates to transparent blends of polymers suitable for use in optical articles; the polymers contain residues of BCC and its derivatives, and have properties particularly suited for use in high density optical data storage media. The polymers further contain residues of other polymers, such as α-methyl polystyrene and polystyrene derivatives; bisphenols, such as bisphenol A; cycloaliphatic polyester resins, such as PCCD and its derivatives or some combination of each.

DETAILED DESCRIPTION OF THE INVENTION

The present invention may be understood more readily by reference to the following detailed description of preferred embodiments of the invention and the Examples included therein.

Before the present compositions of matter and methods are disclosed, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings.

The singular forms "a," "an" and "the" include plural referents unless the context transparently dictates otherwise.

The term "miscible" refers to blends that are a mixture on a molecular level wherein intimate polymer-polymer interaction is achieved.

The term "transparent" is defined herein as an absence of cloudiness, haziness, and muddiness when inspected visually. Transparency was determined by measuring transmission, haze, and yellowness index (YI) using a Gardner Colorimeter.

"Optional" or "optionally" means that the subsequently described event or circumstances may or may not occur, and that description includes instances where the event or circumstance occurs and instances where it does not.

"BCC" is herein defined as 1,1-bis(4-hydroxy-3-methyl phenyl) cyclohexane.

"BisAP" is herein defined as 1,1-bis(4-hydroxyphenyl) methylphenylmethane.

"AMPS" is herein defined as α-methyl polystyrene.

"PS" is herein defined as polystyrene.

"PCCD" is herein defined as poly(cyclohexane-1,4-dimethylene cyclohexane-1,4-dicarboxylate).

"Polycarbonate" or "polycarbonates" as used herein includes copolycarbonates, homopolycarbonates and (co) polyester carbonates.

"$C_g$" is the stress optical coefficient of a polymeric material in the glassy state, measured in Brewsters ($10^{-13}$ cm$^2$/dyne).

"MBR" is the in-plane birefringence of the molded article, measured in units of nanometers.

"VBR" is the vertical birefringence of the molded article, measured in units of nanometers per millimeter (nm/mm).

"Optical articles" as used herein includes optical disks and optical data storage media. For example, a compact disk (CD audio or CD-ROM), a digital versatile disk, also known as DVD (ROM, RAM, rewritable), a recordable digital versatile disk (DVD-R), a digital video recording (DVR), a magneto optical (MO) disk and the like; optical lenses, such as contact lenses, lenses for glasses, lenses for telescopes, and prisms; optical fibers; information recording media; information transferring media; high density data storage media, disks for video cameras, disks for still cameras and the like; as well as the substrate onto which optical recording material is applied. In addition to use as a material to prepare optical articles, a blend of the present invention may be used as a raw material for films or sheets.

"Optical data storage media" of the present invention may be of any type, with compact disks (CDs), digital versatile disks (DVDs), DVD-RWs, HD-DVDs, DVD-Rs, DVRs, and magneto optical disks (MO) being most preferred. Devices may also include recordable and rewritable optical data storage media. In one embodiment of the device, a reflective metal layer is attached directly to the substrate comprising the transparent miscible blend, where the metal layer comprises aluminum, gold, silver, or alloys thereof.

Unless otherwise stated, "mole %" in reference to the composition of a polycarbonate in this specification is based upon 100 mole % of the repeating units of the polycarbonate. For instance, "a polymer comprising 90 mole % of BCC" refers to a polycarbonate in which 90 mole % of the repeating units are residues derived from BCC diphenol or its corresponding derivative(s). Corresponding derivatives include but are not limited to, corresponding oligomers of the diphenols; corresponding esters of the diphenol and their oligomers; and the corresponding chloroformates of the diphenol and their oligomers.

The terms "residues" and "structural units", used in reference to the constituents of the polymers, are synonymous throughout the specification.

Throughout this application where publications are referenced, the disclosures of these publications in their entireties are hereby incorporated by reference into this application in order to more fully describe the state of the art to which this invention pertains.

In one aspect, this invention relates to transparent miscible blend compositions, the transparent miscible blend composition comprising two polymers, wherein said polymers are selected from the group comprising A, B, and C, wherein (A) is a polycarbonate comprising structural units corresponding to structure (I)

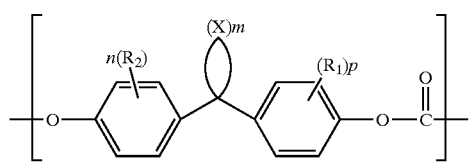
(I)

where $R_1$ and $R_2$ independently comprise a $C_1$–$C_6$ alkyl;

X comprises $CH_2$;

m is an integer from 4 to 7;

n is an integer from 1 to 4; and p is an integer from 1 to 4 with the proviso that at least one of $R_1$ or $R_2$ is in the 3 or 3' position;

(B) is a polymer comprising structural units corresponding to structure (II)

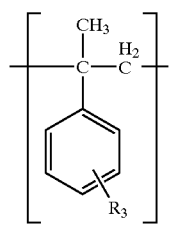
(II)

where $R_3$ comprises a $C_1$–$C_6$ alkyl, hydrogen, cyano or methoxy; and (C) is a polymer comprising structural units corresponding to structure (III)

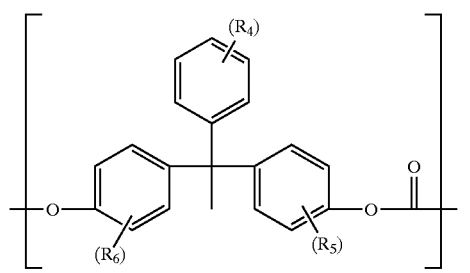
(III)

where $R_4$, $R_5$ and $R_6$ independently comprise a $C_1$–$C_6$ alkyl.

In another aspect, this invention relates to transparent miscible blend compositions, the transparent miscible blend composition comprising polymers A and D, wherein (A) is a polycarbonate comprising structural units corresponding to structure (I)

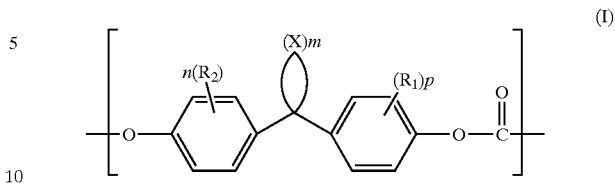
(I)

where $R_1$ and $R_2$ independently comprise a $C_1$–$C_6$ alkyl;

X comprises $CH_2$;

m is an integer from 4 to 7;

n is an integer from 1 to 4; and p is an integer from 1 to 4 with the proviso that at least one of $R_1$ or $R_2$ is in the 3 or 3' position; and (D) is a cycloaliphatic polyester resin comprising structural units corresponding to structure (IV)

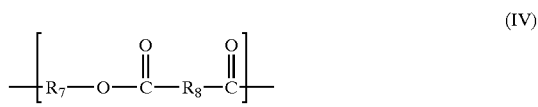
(IV)

wherein $R_7$ comprises a residue of an aryl, alkane or cycloalkane containing diol having from 6 to 20 carbon atoms and $R_8$ comprises a decarboxylated residue of an aryl, aliphatic or cycloalkane containing diacid having form 6 to 20 carbon atoms with the proviso that at least one of $R_7$ or $R_8$ is cycloaliphatic.

In a further aspect, the invention relates to transparent miscible blend compositions, the transparent miscible blend composition comprising polymers A, B, and C, wherein (A) is a polycarbonate comprising structural units corresponding to structure (I)

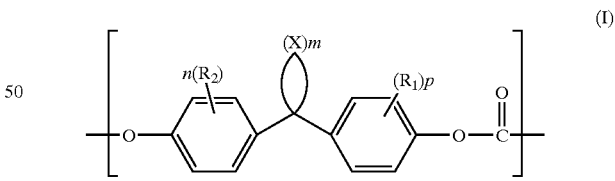
(I)

where $R_1$ and $R_2$ independently comprise a $C_1$–$C_6$ alkyl;

X comprises $CH_2$;

m is an integer from 4 to 7;

n is an integer from 1 to 4; and p is an integer from 1 to 4 with the proviso that at least one of $R_1$ or $R_2$ is in the 3 or 3' position;

(B) is a polymer comprising structural units corresponding to structure (II)

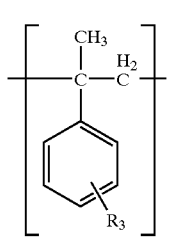

(II)

where $R_3$ comprises a $C_1$–$C_6$ alkyl, hydrogen, cyano or methoxy, and (C) is a polymer comprising structural units corresponding to structure (III)

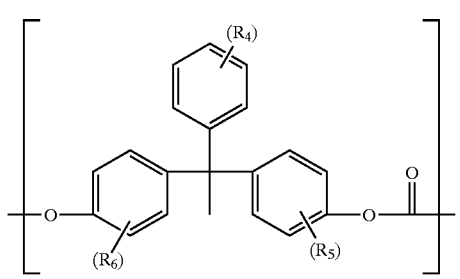

(III)

where $R_4$, $R_5$ and $R_6$ independently comprise a $C_1$–$C_6$ alkyl.

In a further aspect, the invention relates to transparent miscible blend compositions, the transparent miscible blend composition comprising polymers A, B, and E, wherein (A) is a polycarbonate comprising structural units corresponding to structure (I)

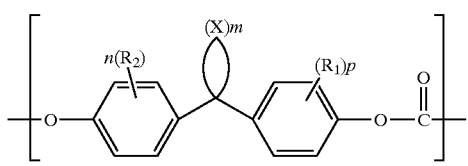

(I)

where $R_1$ and $R_2$ independently comprise a $C_1$–$C_6$ alkyl;

X comprises $CH_2$;

m is an integer from 4 to 7;

n is an integer from 1 to 4; and p is an integer from 1 to 4 with the proviso that at least one of $R_1$ or $R_2$ is in the 3 or 3' position;

(B) is a polymer comprising structural units corresponding to structure (II)

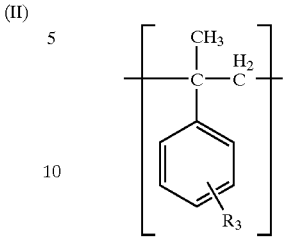

(II)

where $R_3$ comprises a $C_1$–$C_6$ alkyl, hydrogen, cyano or methoxy, and (E) is a polymer comprising structural units corresponding to structure (V)

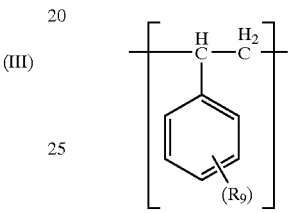

(V)

where $R_9$ comprises a $C_1$–$C_6$ alkyl, hydrogen, cyano or methoxy.

In a further aspect, the invention relates to transparent miscible blend compositions, the transparent miscible blend composition comprising polymers B, C, and E, wherein (B) is a polymer comprising structural units corresponding to structure (II)

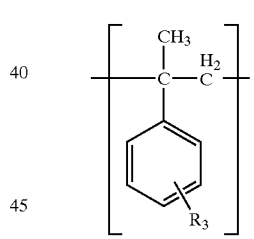

(II)

where $R_3$ comprises a $C_1$–$C_6$ alkyl, hydrogen, cyano or methoxy, (C) is a polymer comprising structural units corresponding to structure (III)

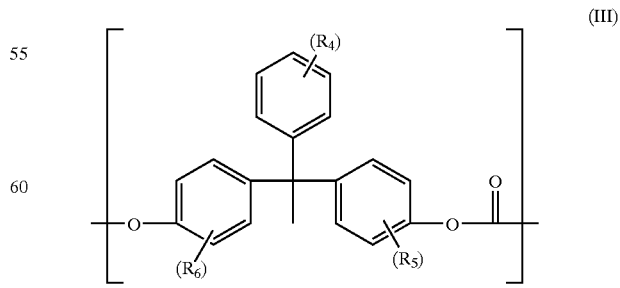

(III)

where $R_4$, $R_5$ and $R_6$ independently comprise a $C_1$–$C_6$ alkyl, and (E) is a polymer comprising structural units corresponding to structure (V)

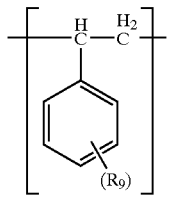

(V)

where $R_9$ comprises a $C_1$–$C_6$ alkyl, hydrogen, cyano or methoxy.

Transparent miscible blends of polymers are rare. Transparent miscible blends are not translucent or opaque. Differential scanning calorimetry testing detects only a single glass transition temperature ($T_g$) for miscible blends composed of two or more components. In addition, scanning electron microscopy detects no contrast indicative of immiscible phases.

Birefringence in an article molded from polymeric material is related to orientation and deformation of its constituent polymer chains. Birefringence has several sources, including the structure and physical properties of the polymer material, the degree of molecular orientation in the polymer material, and thermal stresses in the processed polymer material. For example, the birefringence of a molded optical article is determined, in part, by the molecular structure of its constituent polymer and the processing conditions, such as the forces applied during mold filling and cooling, used in its fabrication which may create thermal stresses and orientation of the polymer chains.

The observed birefringence of a disk is therefore determined by the molecular structure, which determines the intrinsic birefringence, and the processing conditions, which may create thermal stresses and orientation of the polymer chains. Specifically, the observed birefringence is typically a function of the intrinsic birefringence and the birefringence introduced upon molding articles, such as optical disks. The observed birefringence of an optical disk is typically quantified using a measurement termed "in-plane birefringence" or IBR, which is described more fully below.

For a molded optical disk, the IBR is defined as:

$$IBR=(n_r-n_\theta)d=\Delta n_{r\theta}d \quad (3)$$

where $n_r$ and $n_\theta$ are the refractive indices along the r and θ cylindrical axes of the disk; $n_r$ is the index of refraction seen by a light beam polarized along the radial direction; $n_\theta$ is the index of refraction for light polarized azimuthally to the plane of the disk; and d is a measure of the thickness of the disk. The IBR governs the defocusing margin, and a reduction of IBR will lead to the alleviation of problems that are not mechanically correctable. IBR, formally called a retardation, is a property of the finished optical disk, and has units of nanometers.

Two useful gauges of the suitability of a material for use as a molded optical article, such as a molded optical data storage disk, are the material's stress optical coefficient in the melt ($C_m$) and its stress optical coefficient in the glassy state ($C_g$), respectively. The relationship between $C_m$, $C_g$ and birefringence may be expressed as follows:

$$\Delta n = C_m \times \Delta \sigma_m \quad (1)$$

$$\Delta n = C_g \times \Delta \sigma_g \quad (2)$$

where $\Delta n$ is the measured birefringence and $\Delta \sigma_m$ and $\Delta \sigma_g$ are the applied stresses in the melt and glassy states, respectively. The stress optical coefficients $C_m$ and $C_g$ are a measure of the susceptibility of a material to birefringence induced as a result of orientation and deformation occurring during mold filling and stresses generated as the molded article cools.

The stress optical coefficients $C_m$ and $C_g$ are useful as general material screening tools and may also be used to predict the vertical birefringence (VBR) of a molded article, a quantity critical to the successful use of a given material in a molded optical article. For a molded optical disk, the VBR is defined as:

$$VBR=(n_r-n_z)=\Delta n_{rz} \quad (3)$$

where $n_r$ and $n_z$ are the refractive indices along the r an z cylindrical axes of the disk; $n_r$ is the index of refraction seen by a light beam polarized along the radial direction, and $n_z$ is the index of refraction for light polarized perpendicular to the plane of the disk. The VBR governs the defocusing margin, and reduction of VBR will lead to alleviation of problems which are not correctable mechanically.

In the search for improved materials for use in optical articles, $C_m$ and $C_g$ are especially useful since they require minimal amounts of material and are relatively insensitive to uncontrolled measurement parameters or sample preparation methods, whereas measurement of VBR requires significantly larger amounts of material and is dependent upon the molding conditions. In general, it has been found that materials possessing low values of $C_g$ and $C_m$ show enhanced performance characteristics, for example VBR, in optical data storage applications relative to materials having higher values of $C_g$ and $C_m$. Therefore, in efforts aimed at developing improved optical quality, widespread use of $C_g$ and $C_m$ measurements is made in order to rank potential candidates for such applications and to compare them with previously discovered materials.

A blending process, as opposed to a copolymerization process, provides certain advantages. Advantages of the blending process include producing compositions that are either expensive or unattainable by a copolymerization process.

The blend composition further provides polycarbonate blends having ideal optical properties and suitable glass transition temperatures ($T_g$), and which are suitable for use in optical articles. Suitable glass transition temperatures are necessary to provide adequate processibility, for example, ideal molding characteristics.

The applicants have found that the transparent miscible polymer blends as defined herein, are also suitable for use in high data storage density optical media. In particular, the blends of the present invention have good transparency, low water absorption, good processibility, good thermal stability, and low birefringence.

In a further aspect, the present invention relates to data storage media having both a data storage layer, and an adjacent transparent overlayer wherein the data storage layer is capable of reflecting an energy field incident upon said transparent overlayer prior to being incident upon said data layer. Specifically, this aspect of the present invention relates to data storage media comprising thin, about 100 microns to about 0.6 mm, transparent overlayers of the defined miscible transparent blend compositions. As mentioned, an embodiment of a data storage medium is a DVD. The DVD typically has two substrates, each about 120 mm in radius and about 0.6 mm thick. These substrates are bonded together to make a double-sided optical medium. An alternative embodiment of a data storage medium is a DVR, which typically has a polycarbonate substrate (data layer) of about 1.1 mm in thickness and an overlayer about 100 microns in thickness, the two layers bonded using an adhesive material.

As discussed above, the transparent blend compositions posses suitable properties for use in optical media, in particular optical data storage applications. The transparent miscible blends of the present invention have glass transition temperatures in the range of about 100° C. to about 185° C., more preferably in the range of about 125° C. to about 165° C., and even more preferably in the range of about 130° C. to about 150° C. The water absorption of the transparent miscible blend compositions is preferably less than about 0.33%, and more preferably less than about 0.2%, at equilibrium. The IBR values of a disk molded from the transparent miscible blend compositions are about −100 nanometers to about 100 nanometers, preferably about −50 nanometers to about 50 nanometers, and even more preferably about −40 nanometers to about 40 nanometers.

For the transparent miscible blend compositions comprising two polymers, the weight average molecular weight (Mw) of the first polymer and the second polymer, as determined by gel permeation chromatography relative to polystyrene, is preferably in the range from about 10,000 to about 100,000 grams per mol (g/mol), more preferably in the range from about 10,000 to about 50,000 g/mol, and even more preferably in the range from about 12,000 to about 40,000 g/mol. The transparent miscible blend compositions, comprising two polymers, preferably have a light transmittance of at least about 85%, more preferably at least about 90%.

For the transparent miscible blend compositions comprising three polymers, the weight average molecular weight (Mw) of the first polymer, the second polymer, and the third polymer, as determined by gel permeation chromatography relative to polystyrene, is preferably in the range from about 10,000 g/mol to about 100,000 g/mol, more preferably in the range from about 10,000 to about 50,000 g/mol, even more preferably in the range from about 12,000 to about 40,000 g/mol. The transparent miscible blend compositions, comprising three polymers, preferably have a light transmittance of at least about 85%, more preferably at. least about 90%.

The compositions of the particular blends may be varied within certain ranges to achieve a suitable property profile. The blends are miscible through the whole range of compositions.

In the case of the blend compositions comprising two polymers, the percentages of the polymers are about 1 to about 99 weight % of the first polymer portion and about 1 to about 99 weight % of the second polymer, with the total weight % of the first and second components preferably equal to about 100 weight %.

In the embodiments of the blends comprising two polymers, those of which include polymer A as a first component and one of polymer B or polymer D as a second component, component polymer A is the dominant component and comprises from about 1 to about 99 weight % of the blend, preferably from about 10 to about 99 weight % of the blend, more preferably from about 30 to about 99 weight % of the blend, and even more preferably from about 60 to about 99 weight % of the blend. In another embodiment, component polymer A comprise from about 90 to about 99 weight % of the blend. The second component, one of polymer B or polymer D, comprises from about 1 to about 40 weight % of the blend, more preferably from about 5 to about 30 weight % of the blend, and even more preferably from about 10 to about 30 weight % of the blend, wherein the total weight % of the first and second components preferably equal to about 100 weight %.

In the embodiments of the blends comprising two polymers, those of which include polymer C as a first component and polymer B as a second component, component polymer C is the dominant component and comprises from about 1 to about 99 weight % of the blend, preferably from about 10 to about 99 weight % of the blend, more preferably from about 30 to about 99 weight % of the blend, and even more preferably from about 60 to about 99 weight % of the blend. In another embodiment, polymer C comprise from about 90 to about 99 weight % of the blend. The second component, polymer B, comprises from about 1 to about 40 weight % of the blend, more preferably from about 5 to about 30 weight % of the blend, and even more preferably from about 10 to about 30 weight % of the blend.

In the embodiment of the blend comprising two polymers, those of which include polymer A as a first component and polymer C as a second component, either component may be the dominant component. In an alternative embodiment, polymer A and polymer B may be found in equal proportions.

The particular composition of the blend may be adjusted depending on a number of factors including the end use of the blend and the desired properties of the blend. The composition of the blend is adjusted based on the ratio of the components. For example, more of a component in the blend helps to maintain low water absorption and good birefringence.

Representative units of structure (I) include, but are not limited to, residues of 1,1-bis(4-hydroxy-3-methylphenyl)cyclohexane (BCC); 1,1-bis(4-hydroxy-3-methylphenyl)cyclopentane; 1,1-bis(4-hydroxy-3-methylphenyl)cycloheptane, and mixtures thereof. Residues of BCC are most preferred as structural units (I).

In one embodiment of the invention, the blend comprises from about 90 to about 100 mol % of residues of BCC, structure (VI). BCC may be easily synthesized from cyclohexanone and ortho-cresol.

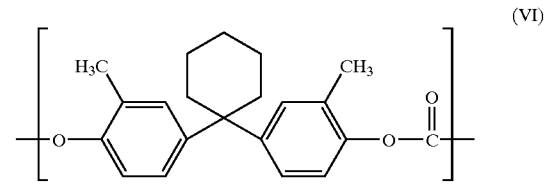

(VI)

A polycarbonate, comprising 100 mole % of structural units derived from BCC, is herein referred to as "BCC homopolycarbonate".

In the present invention, it is critical that the structural units of structure (I) be substituted in the 3 or 3' position by at least one of $R_1$ or $R_2$. It is preferable that n and p are equal to one, and that $R_1$ and $R_2$ are present in the 3 and 3' positions, respectively. $R_1$ and $R_2$ are preferably a $C_1$–$C_6$ alkyl, more preferably a $C_1$–$C_3$ alkyl, and even more preferably $CH_3$.

There has been a great deal of interest in the blending of polycarbonates and polystyrenes in the last decade. It would be desirable, for instance, to decrease the water absorption, raise the modulus, and decrease the stress optical coefficients of the polycarbonate by blending in a polystyrene. BPA polycarbonate and polystyrene, however, are immiscible. Therefore, it was surprising to find that polymers having structure (I) were miscible with polymers having structure (II), and that the resulting blend is suitable for use in optical articles, in particular, in optical data storage media.

Representative units of structure (II) are α-methyl polystyrene in which the phenyl ring may be substituted or unsubstituted. In one embodiment, the second polymer of the blend comprises about 100 mol % of residues of α-methyl polystyrene. α-methyl polystyrene may be obtained by free radical, anionic, or cationic polymerization of α-methylstyrene as described in the literature.

Representative units of structure (III) are residues of BisAP in which the phenyl rings may be substituted or unsubstituted. In one embodiment, the second polymer of the blend comprises about 100 mol % of residues of BisAP. BisAP may be obtained by the acid catalyzed condensation of acetophenone with phenol.

The cycloaliphatic polyester resin comprises a polyester having repeating units of the structure (IV)

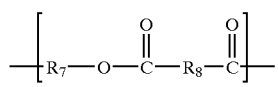
(IV)

where at least one of R7 or R8 is a cycloalkyl containing radical.

The polyester is a condensation product where R7 is the residue of an aryl, alkane or cycloalkane containing diol having 6 to 20 carbon atoms or chemical equivalent thereof, and R8 is the decarboxylated residue derived from an aryl, aliphatic or cycloalkane containing diacid of 6 to 20 carbon atoms or chemical equivalent thereof with the proviso that at least one R7 or R8 is cycloaliphatic. Preferred polyesters of the invention will have both R7 and R8 cycloaliphatic.

The present cycloaliphatic polyesters are condensation products of aliphatic diacids, or chemical equivalents and aliphatic diols, or chemical equivalents. The present cycloaliphatic polyesters may be formed from mixtures of aliphatic diacids and aliphatic diols but must contain at least 50 mol % of cyclic diacid and/or cyclic diol components, the remainder, if any, being linear aliphatic diacids and/or diols. The cyclic components are necessary to impart good rigidity to the polyester and to allow the formation of transparent blends due to favorable interaction with the polycarbonate resin.

The polyester resins are typically obtained through the condensation or ester interchange polymerization of the diol or diol equivalent component with the diacid or diacid chemical equivalent component.

R7 and R8 are preferably cycloalkyl radicals independently selected from the following formula:

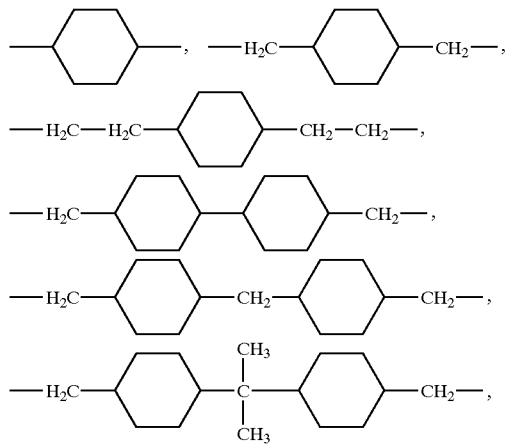

-continued

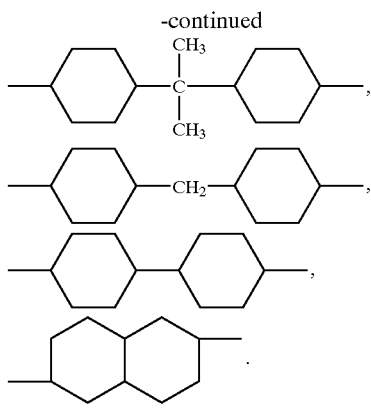

The preferred cycloaliphatic radical R8 is derived from the 1,4-cyclohexyl diacids and most preferably greater than 70 mol % thereof in the form of the trans isomer. The preferred cycloaliphatic radical R7 is derived from the 1,4-cyclohexyl primary diols such as 1,4-cyclohexyl dimethanol, most preferably more than 70 mol % thereof in the form of the trans isomer.

Other diols useful in the preparation of the polyester resins of the present invention are straight chain, branched, or cycloaliphatic alkane diols and may contain from 2 to 12 carbon atoms. Examples of such diols include but are not limited to ethylene glycol; propylene glycol, i.e., 1,2- and 1,3-propylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; triethylene glycol; 1,10-decane diol; and mixtures of any of the foregoing. Preferably, a cycloaliphatic diol or chemical equivalent thereof and particularly 1,4-cyclohexane dimethanol or its chemical equivalents are used as the diol component.

Chemical equivalents to the diols include esters, such as dialkylesters, diaryl esters, and the like.

The diacids useful in the preparation of the aliphatic polyester resins of the present invention are preferably cycloaliphatic diacids. This is meant to include carboxylic acids having two carboxyl groups each of which is attached to a saturated carbon. Preferred diacids are cyclo or bicyclo aliphatic acids, for example, decahydro naphthalene dicarboxylic acids, norbornene dicarboxylic acids, bicyclo octane dicarboxylic acids, 1,4-cyclohexanedicarboxylic acid or chemical equivalents, and most preferred is trans-1,4-cyclohexanedicarboxylic acid or a chemical equivalent. Linear dicarboxylic acids like adipic acid, azelaic acid, dicarboxyl dodecanoic acid, and succinic acid may also be useful.

Cyclohexane dicarboxylic acids and their chemical equivalents can be prepared, for example, by the hydrogenation of cycloaromatic diacids and corresponding derivatives such as isophthalic acid, terephthalic acid, or naphthalenic acid in a suitable solvent such as water or acetic acid using a suitable catalysts such as rhodium supported on a carrier such as carbon or alumina. See, Friefelder et al., Journal of Organic Chemistry, 31, 3438 (1966); U.S. Pat. Nos. 2,675,390 and 4,754,064. They may also be prepared by the use of an inert liquid medium in which a phthalic acid is at least partially soluble under reaction conditions and with a catalyst of palladium or ruthenium on carbon or silica. See, U.S. Pat. Nos. 2,888,484 and 3,444,237.

Typically, in the hydrogenation, two isomers are obtained in which the carboxylic acid groups are in cis- or trans-positions. The cis- and trans-isomers can be separated by crystallization with or without a solvent, for example, n-heptane, or by distillation. The cis-isomer tends to blend better; however, the trans-isomer has higher melting and crystallization temperatures and may be preferred. Mixtures of the cis- and trans-isomers are useful herein as well.

When the mixture of isomers or more than one diacid or diol is used, a copolyester or a mixture of two polyesters may be used as the present cycloaliphatic polyester resin.

Chemical equivalents of these diacids include esters, alkyl esters, e.g., dialkyl esters, diaryl esters, anhydrides, salts, acid chlorides, acid bromides, and the like. The preferred chemical equivalents comprise the dialkyl esters of the cycloaliphatic diacids, and the most favored chemical equivalent comprises the dimethyl ester of the acid, particularly dimethyl-1,4-cyclohexane-dicarboxylate.

A preferred cycloaliphatic polyester is poly(cyclohexane-1,4-dimethylene cyclohexane-1,4-dicarboxylate) also referred to as poly(1,4-cyclohexane-dimethanol-1,4-dicarboxylate) (PCCD) which has recurring units of formula II:

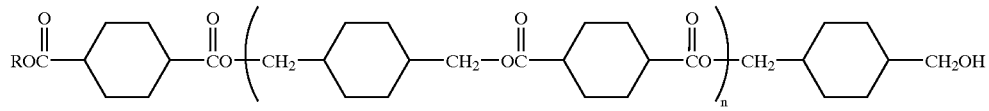

With reference to the previously set forth general formula, for PCCD, R is derived from 1,4 cyclohexane dimethanol; and R1 is a cyclohexane ring derived from cyclohexanedicarboxylate or a chemical equivalent thereof. The favored PCCD has a cis/trans formula.

The polyester polymerization reaction is generally run in the melt in the presence of a suitable catalyst such as a tetrakis (2-ethyl hexyl) titanate, in a suitable amount, typically about 50 ppm to about 200 ppm of titanium based upon the final product.

The preferred aliphatic polyesters used in the present transparent molding compositions have a glass transition temperature ($T_g$) above about 50° C., more preferably above about 80° C., and even more preferably above about 100° C.

Also contemplated herein are the above polyesters with from about 1 to about 50% by weight, of units derived from polymeric aliphatic acids and/or polymeric aliphatic polyols to form copolyesters. The aliphatic polyols include glycols, such as poly(ethylene glycol) or poly(butylene glycol).

In the embodiments of the present invention comprising blending three polymers to produce transparent miscible blends, a first polymer (B) is a polymer comprising structural units corresponding to structure (II). Second and third polymers are selected from the group comprising A, C, and E, wherein (A) is a polymer comprising structural units corresponding to structure (I), (C) is a polymer comprising structural units corresponding to structure (III), and (E) is a polymer comprising structural units corresponding to structure (V).

In one embodiment of the present invention, the transparent miscible blend comprising polymers B, A, and C is from about 1 to about 50 weight % of the first polymer (B), from about 1 to about 80 weight % of the second polymer (A), and from about 1 to about 80 weight % of the third polymer (C). More preferably, the blend comprises from about 5 to about 25 weight % of the first polymer (B), from about 3 to about 70 weight % of the second polymer (A), and from about 20 to about 75 weight % of the third polymer (C).

In one embodiment of the present invention, the transparent miscible blend comprising polymers B, A, and E is from about 1 to about 30 weight % of the first polymer (B), from about 50 to about 98 weight % of the second polymer (A), and from about 1 to about 20 weight % of the third polymer (E). More preferably, the blend comprises from about 5 to about 20 weight % of the first polymer (B), from about 70 to about 90 weight % of the second polymer (A), and from about 5 to about 10 weight % of the third polymer (E).

In one embodiment of the present invention, the transparent miscible blend comprising polymers B, C, and E is from about 1 to about 30 weight % of the first polymer (B), from about 50 to about 98 weight % of the second polymer (C), and from about 1 to about 20 weight % of the third polymer (E). More preferably, the blend comprises from about 5 to about 20 weight % of the first polymer (B), from about 70 to about 90 weight % of the second polymer (C), and from about 5 to about 10 weight % of the third polymer (E).

Representative units of structure (V) are residues of styrene in which the phenyl rings may be substituted or unsubstituted. In one embodiment, the third polymer of the blend comprises about 100 weight % of residues of polystyrene.

The blends of the present invention may optionally be blended with any other additives such as polymers that are miscible, in amounts that do not cause cloudiness, including but not limited to bisphenol A (BPA) polycarbonate or 2,2-bis(4-hydroxyphenyl)propane, 6,6'-dihydroxy-3,3,3',3'-tetramethylspirobiindane (SBI), dimethyl-BPA (DMBPA), tetramethyl-BPA (TMBPA), and dimethyl-1,1-bis(4-hydroxyphenyl)methylphenylmethane (DMbisAP).

The transparent miscible blends of the present invention may optionally be blended with any conventional additives used in optical applications, including but not limited to dyestuffs, UV stabilizers, antioxidants, heat stabilizers, and mold release agents, to form an optical article. In particular, it is preferable to form a blend of the polycarbonate and additives which aid in the processing of the blend to form the desired optical article. The blend may optionally comprise from about 0.0001 to about 10% by weight of a predetermined desired additive, more preferably from about 0.0001 to about 1.0% by weight of the predetermined desired additive.

Substances or additives which may be added to the polymers of this invention, include, but are not limited to, heat-resistant stabilizers, UV absorbers, mold-release agents, antistatic agents, slip agents, antiblocking agents, lubricants, anticlouding agents, coloring agents, fluorescent dyes and colorants, natural oils, synthetic oils, waxes, organic fillers, inorganic fillers, other miscible polymers, and mixtures thereof. Suitable antistatic agents include distearylhydroxylamine, triphenyl amine, tri-n-octylphosphine oxide, triphenyl phosphine oxide, pyridine N-oxide, ethoxylated sorbitan monolaurate, and poly (alkylene glycol) compounds.

Examples of the aforementioned heat-resistant stabilizers, include, but are not limited to, phenol stabilizers, organic thioether stabilizers, organic phosphide stabilizers, hindered amine stabilizers, epoxy stabilizers and mixtures thereof. The heat-resistant stabilizer may be added in the form of a solid or a liquid.

Examples of UV absorbers include, but are not limited to, salicylic acid UV absorbers, benzophenone UV absorbers, benzotriazole UV absorbers, cyanoacrylate UV absorbers, and mixtures thereof.

Examples of the mold-release agents include, but are not limited to, natural and synthetic paraffins, polyethylene waxes, fluorocarbons, and other hydrocarbon mold-release agents comprising; stearic acid, hydroxystearic acid, and other higher fatty acids, hydroxyfatty acids, and other fatty acid mold-release agents; stearic acid amide, ethylenebisstearoamide, and other fatty acid amides, alkylenebisfatty acid amides, and other fatty acid amide mold-release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acid, polyhydric alcohol esters of fatty acid, polyglycol esters of fatty acid, and other fatty acid ester mold release agents; silicone oil and other silicone mold release agents, and mixtures of any of the aforementioned.

The coloring agent may be either a pigment or a dye. Inorganic coloring agents and organic coloring agents may be used separately or in combination in the invention.

Optionally, suitable carbonate redistribution catalysts may be introduced into the blend. Suitable redistribution catalysts include a wide variety of bases and Lewis acids. Illustrative examples include, amines, particularly 1,3-dimethylaminopropane, imidazole, benzimidazole, and benzotriazole, as well as other organic bases, for example tetraalkylammonium hydroxides, such as tetramethylammonium hydroxide, usually as the pentahydrate, diethyldimethylammonium hydroxide, and tetraethylammonium hydroxide; tetraalkylammonium phenoxides, such as tetramethylammonium phenoxide, usually as the monohydrate; tetraalkylarmuonium acetates, such as tetramethylammonium acetate; tetraalkylammonium tetraphenylborates, such as tetramethylammonium tetraphenylborate; as well as lithium stearate, the lithium salt of bisphenol A, the tetraethylammonium salt of bisphenol A, sodium phenoxide, and the like. Other suitable organic bases include phosphines, for example, triphenylphosphine. A wide variety of organometallics are suitable catalysts, including organotin compounds, such as di(n-butyl)tin oxide, di(n-octyl)tin oxide, di(n-butyl)tin dibutoxide, di(n-butyl)tin dioctoate, dibutyltin, tetrabutyltin, tributyltin trifluoroacetate, tributyltin chlorophenoxide, bis[(dibutyl)(phenoxy)tin] oxide, and tributyltin hydride; as well as organotitanium compounds, such as titanium tetra(isopropoxide), titanium tetra(5-methylheptoxide), and titanium tetra(butoxide); as well as, zirconium tetra(isopropoxide), aluminum tri(ethoxide), aluminum tri(phenoxide), mercuric acetate, lead acetate, (diphenyl)mercury, (tetraphenyl)lead, and (tetraphenyl) silane. Also suitable are a variety of hydrides, including sodium hydride, lithium hydride, aluminum hydride, boron trihydride, tantalum and niobium hydride, lithium aluminum hydride, lithium borohydride, sodium borohydride, tetramethylammonium borohydride, tetra(n-butylammonium) borohydride, lithium tri(t-butoxy) aluminum hydride, and diphenylsilane; as well as simple inorganics, such as lithium hydroxide, sodium silicate, sodium borate, silica, lithium fluoride, lithium chloride, lithium carbonate, and zinc oxide.

The desired optical article may be obtained by molding the transparent miscible blend by injection molding, compression molding, extrusion methods, and solution casting methods. Injection molding is the preferred method of forming the article.

Because the blends of the present invention possess advantageous properties such as low water absorption, good processibility, and low birefringence, they can be advantageously utilized to produce optical articles. End-use applications for the optical articles of the blends of the present invention comprise digital audio disks, digital versatile disks, optical memory disks, compact disks, DVR and MO media and the like; optical lenses, such as contact lenses, lenses for glasses, lenses for telescopes, and prisms; optical fibers; magneto optical disks; information recording media; information transferring media; disks for video cameras, disks for still cameras, and the like.

The blend may function as the medium for data storage, i.e. the data may be fixed onto or into the polymer. The blend may also function as the substrate onto which a data storage medium is applied. Further, some combination of both functions may be employed in a single device.

In addition to use as optical articles, the blends of the present invention are useful in producing transparent articles of manufacture having favorable properties. These properties include food chemical resistance and melt processibility. The blends of the present invention are especially useful in making molded articles, fibers, films and sheeting.

The blends of the present invention can be made by methods which include the blending of the polymers at temperatures above about 240° C., preferably in the range of about 240° C. to about 300° C., for a time sufficient to form a transparent blend composition. Suitable methods for forming the blend include, but are not limited to, the melt method, the solution prepared method, the dry blending method, and extrusion.

In addition to the compositions described above, the blends of the present invention may include at least one other modifying polymer. Suitable modifying polymers are those which form miscible blends with the first and second polycarbonate portions. Possible modifying polymers include other polycarbonates, polyesters, polyamides, polystyrenes, polyurethanes, polyarylates, liquid crystalline polymers, vinyl polymers and the like, and mixtures thereof. Suitable modifying polymers may be determined by one of ordinary skill in the art by performing traditional miscibility tests with possible modifying polymers.

EXAMPLES

The following examples are put forth so as to provide those of ordinary skill in the art with a complete disclosure and description of how the compositions of matter and methods claimed herein are made and evaluated, and not intended to limit the scope of what the inventors regard as their invention. Efforts have been made to insure accuracy with respect to numbers (e.g., amounts, temperatures, etc.) but some error and deviations should be accounted for. Unless indicated otherwise, parts are by weight, temperature is in ° C. or is at room temperature, and pressure is at or near atmospheric.

The materials and testing procedures used for the results shown herein are as follows:

Water absorption (% $H_2O$) was determined by the following method, which is similar to ASTM D570, but modified to account for the variable thickness of the parts described in the examples. The plastic part or disk was dried in a vacuum for over 1 week. The sample was removed periodically and weighed to determine if it was dry (stopped loosing mass). The sample was removed from the oven, allowed to equilibrate to room temperature in a dessicator, and the dry weight was recorded. The sample was immersed in a water bath at 23° C. The sample was removed periodically from the bath, the surface was blotted dry, and the weight recorded. The sample was repeatedly immersed and the weight measured until the sample became substantially saturated. The sample was considered substantially saturated or at "equilibrium" when the increase in weight in a 2 week period averaged less than 1% of the total increase in weight (as described in ASTM method D-570-98 section 7.4).

Glass transition temperature ($T_g$) values were determined by differential scanning calorimetry using a PERKIN ELMER DSC7. The $T_g$ was calculated based on the ½ Cp method using a heating ramp of 20° C./minute.

Transmission measurements were obtained at 630 nm using an HP 8453 UV-vis spectrophotometer. The values were not corrected for reflection at the surface of the parts or for light scattering through the thickness of the parts. Transmission, YI and haze measurements using visible light were obtained using a Gardner calorimeter.

$C_g$ values were determined as follows. The polymer (7.0 grams) was charged to a heated mold having dimensions 5.0×0.5 inches and compression molded at 120° C. above its glass transition temperature while being subjected to applied pressure starting at 0 and ending at 2000 pounds using a standard compression molding device. After the required amount of time under these conditions the mold was allowed to cool and the molded test bar removed with the aid of a Carver press. The molded test bar was then inspected under a polaroscope and an observation area on the test bar located. Selection of the observation area was based on lack of birefringence observed and sufficient distance from the ends or sides of the test bar. The sample was then mounted in a device designed to apply a known amount of force vertically along the bar while the observation area of the bar was irradiated with appropriately polarized light. The bar was then subjected to six levels of applied stress and the birefringence at each level measured with the aid of a Babinet compensator. Plotting birefringence versus stress affords a line whose slope is equal to the stress optical coefficient $C_g$.

Values of in-plane birefringence (IBR), and vertical birefringence (VBR) were measured using a Dr. Schenk Prometeus MT136E optical disk tester. The CD disks were molded, and the birefringence measurements were made on the unmetallized, CD substrates (1.2 mm disk).

Barrel temperature is indicative of how hot the polymer is inside of the machine as you inject it into the mold and the mold temperature is the temperature of the cavity mold that the polymer is being released into. The barrel temperature may be, for example, 350° C. and the mold temperature may be, for example 100° C.

Examples 1–35

Listed in Table 1 are experimental glass transition temperatures ($T_g$s) for several of the blends of the present invention. In examples 1–35, $T_g$s were obtained from solvent cast films. Films were prepared in the following manner. A 4 wt % concentration solution was prepared for each of the polymers. The solutions were then combined to form the appropriate mixture. For example, for a 90/10 mixture of BCC and AMPS (Example 1), 9 g of a BCC solution was combined with 1 g of a AMPS solution. The combined solutions were then spread onto a glass slide and the solvent was left to evaporate overnight. The resulting films were dried for 3 days at 110° C. in a vacuum oven. Once dry, the films were examined for clarity and a $T_g$ was measured. All of the films in Table 1 were transparent, not hazy, and had a single, well defined glass transition that could be predicted by the following mixture equation for the $T_g$ of the blend, $T_{gblend}$:

$$1/T_{g,blend} = w_1/T_{g1} + w_2/T_{g2}$$

where $w_1$ and $w_2$ are the weight fractions and $T_{g1}$ and $T_{g2}$ are the glass transition temperatures in units of Kelvin for each of the individual polymers of the 2-component blend.

Examples 1–5 indicate that BCC and AMPS can be mixed to form single $T_g$, transparent blends. The $T_g$ of the blend is well defined by the $T_g$ mixture equation given the $T_g$s of the BCC and AMPS polymers, Examples C1 and C2, respectively. Transparent, single $T_g$ blends are also indicated for Examples 6–10 for BCC/BisAP blends, Examples 11–15 for BCC/PCCD blends and Examples 16–21 for BisAP/AMPS blends. The $T_g$s for BisAP and PCCD, Examples C3 and C4, respectively, are also listed in Table 1.

TABLE 1

Examples of Polymer Blends - Film Data

| Example | BCC [wt %] | AMPS [wt %] | BisAP [wt %] | PCCD [wt %] | PS [wt %] | Tg [° C.] |
|---|---|---|---|---|---|---|
| C1 | 1 | | | | | 141 |
| C2 | | 1 | | | | 76 |
| C3 | | | 1 | | | 180 |
| C4 | | | | 1 | | 70 |
| 1 | 0.9 | 0.1 | | | | 121 |
| 2 | 0.8 | 0.2 | | | | 118 |
| 3 | 0.7 | 0.3 | | | | 111 |
| 4 | 0.5 | 0.5 | | | | 98 |
| 5 | 0.3 | 0.7 | | | | 94 |
| 6 | 0.9 | | 0.1 | | | 144 |
| 7 | 0.8 | | 0.2 | | | 146 |
| 8 | 0.6 | | 0.4 | | | 150 |
| 9 | 0.4 | | 0.6 | | | 160 |
| 10 | 0.2 | | 0.8 | | | 170 |
| 11 | 0.9 | | | 0.1 | | 131 |
| 12 | 0.8 | | | 0.2 | | 125 |
| 13 | 0.7 | | | 0.3 | | 116 |
| 14 | 0.4 | | | 0.6 | | 95 |
| 15 | 0.2 | | | 0.8 | | 80 |
| 16 | | 0.1 | 0.9 | | | 164 |
| 17 | | 0.2 | 0.8 | | | 147 |
| 18 | | 0.25 | 0.75 | | | 143 |
| 19 | | 0.3 | 0.7 | | | 131 |
| 20 | | 0.5 | 0.5 | | | 119 |
| 21 | | 0.7 | 0.3 | | | 113 |
| 22 | 0.04 | 0.25 | 0.71 | | | 138 |
| 23 | 0.10 | 0.10 | 0.80 | | | 171 |
| 24 | 0.10 | 0.80 | 0.10 | | | 136 |
| 25 | 0.19 | 0.20 | 0.61 | | | 137 |
| 26 | 0.20 | 0.60 | 0.20 | | | 144 |
| 27 | 0.33 | 0.33 | 0.33 | | | 155 |
| 28 | 0.35 | 0.15 | 0.50 | | | 138 |
| 29 | 0.50 | 0.10 | 0.40 | | | 137 |
| 30 | 0.65 | 0.05 | 0.30 | | | 139 |
| 31 | 0.65 | 0.15 | 0.20 | | | 130 |
| 32 | 0.8 | 0.1 | | | 0.1 | 126 |
| 33 | 0.75 | 0.2 | | | 0.05 | 115 |
| 34 | | 0.1 | 0.8 | | 0.1 | 164 |
| 35 | | 0.2 | 0.75 | | 0.05 | 144 |

Examples 22–35 also indicate transparent, single-$T_g$ blends from 3 components. When 3 polymers are blended together, $T_{gblend}$ is predicted from the weight fraction of each of the individual polymers, $w_1$, $w_2$, and $w_3$ and the $T_g$s of each of the individual polymers, $T_{g1}$, $T_{g2}$, and $T_{g3}$ using the following mixture rule:

$$1/T_{g,blend} = w_1/T_{g1} + w_2/T_{g2} + w_3/T_{g3}$$

Examples 22–31 demonstrate that blends of BCC, AMPS and BisAP also have well defined $T_g$s that follow the 3-component mixture rule. Examples 32 and 33, for BCC/ AMPS/PS blends and Examples 34 and 35, for BisAP/ AMPS/PS blends, demonstrate that polycarbonates and polystyrene can be mixed to form transparent blends if AMPS is also included in the mixture.

Examples 36–43

Select examples of the transparent polymer blends (listed in Table 2) were molded into optical articles in order to measure $T_g$, $C_g$, percent optical transmission, and equilibrium water uptake. Optical transmission at 630 nm was measured using a HP UV-Visible spectrophotometer. The blend should have an optical transmission of at least about 75%, more preferably at least about 80% and a $C_g$ of less than about 60 Brewsters, more preferably less than 55 Brewsters, even more preferably less than 50 Brewsters. The blends were prepared by mixing dry powder from each of the individual polymer components in a Henschel high intensity mixer then molded into optical articles. $C_g$ bars were either compression molded (Examples 39 and 43), or injection molded at temperatures between 250 and 320° C. into tensile bars (Examples 36–38 and 40–42) with "dogbone" shapes (gage section-0.125" thick; 0.500" wide.

Examples 36 and 37 (BCC/AMPS blends) indicate that addition of AMPS decreases the $C_g$ of the blend (49 Brewsters) relative to the BCC homopolymer (52 Brewsters), while maintaining a high optical transmission. Similarly, Example 38 shows that the BCC/PCCD blend also has a high optical transmission and a $C_g$ slightly decreased relative to BCC. Examples 39 and 40, BCC/BisAP blends, also show single $T_g$s and a high transmission (Example 40), though the $C_g$ is increased relative to BCC with the addition of BisAP. Finally, 3-component blends are also shown in Examples 41–43 to have single $T_g$s and high transmission. The BCC/AMPS/BisAP blend, Example 42, has a $C_g$ of 40 Brewsters, which is substantially decreased relative to BCC and BPA-PC. Most of the blends, with the notably exception of those containing a large percentage (> about 80%) of BisAP, have lower equilibrium water uptake than BPA-PC. It is believed that low water uptake is desirable in order for optical disks to maintain low tilt and warpage and high data fidelity.

Examples 44–51

The examples shown in Table 3 were prepared by mixing dry powder from each of the individual polymer components in a Henschel high intensity mixer and fed into a 28 mm WP extruder equipped with a mild screw design. The extrusion was performed using barrel temperatures from about 260 to about 280° C. at a screw speed of 300 rpm and a throughput of from about 10 to 20 lbs/hr. The resulting pellets were then injection molded into compact disks using an Engel 275 ton injection molding machine using barrel temperatures ranging from 550 to 580° F. and mold temperatures ranging from 171 to 208° F., as shown in Table 3. The optical transmission at 630 nm, was greater than 88% for all the disks. Furthermore, the yellowness index (YI) and haze, both measured by a Gardner colorimeter, were below 5 and 15, respectively, within acceptable limits for CD substrates. The high transmittance and low haze of these examples support the conclusion that the polymer blend are miscible.

All of the blends in Examples 44–51 have substantially lower $C_g$, IBR and VBR values than BPA-PC (Example C8), and most have lower birefringence than BCC (Example C9). As the in-plane birefringence (IBR) is at a maximum near the inner radius of these CDs and at a minimum near the outer radius, the range of IBR is indicated by tabulating the maximum IBR at 30 mm and the minimum IBR at 50 mm, an shown in Table 3. The difference between the maximum and minimum values gives the range of IBR (ΔIBR). It is preferable that the maximum IBR is less than 100 nm, more preferable that it is less than 50 nm, and even more preferable that it is less than 30 nm. Similarly, it is preferable that the minimum IBR is greater than −100 nm, more preferable that it is greater than −50 nm and even more preferable that it is greater than −30 nm. Also in Table 3, are average values of vertical birefringence (VBR) calculated by taking the arithmetic mean of VBR values at 30 and 50 mm.

TABLE 2

Examples of Polymer Blends - Molded Articles

| Example | BCC [wt %] | AMPS [wt %] | BisAP [wt %] | PCCD [wt %] | PS [wt %] | Tg [° C.] | Cg [Brewsters] | % T at 630 nm | % Water Uptake |
|---|---|---|---|---|---|---|---|---|---|
| C5: BPA-PC | | | | | | 148 | 85 | 88 | 0.35 |
| C6: BCC | 1 | | | | | 140 | 52 | 89 | 0.22 |
| C7: BisAP | | | 1 | | | 180 | | 87 | 0.41 |
| 36 | 0.9 | 0.1 | | | | 129 | 49 | 85 | |
| 37 | 0.8 | 0.2 | | | | 123 | | 85 | |
| 38 | 0.9 | | | 0.1 | | 134 | 50 | 84 | 0.26 |
| 39 | 0.2 | | 0.8 | | | 170 | 55–60 | *** | 0.39 |
| 40 | 0.7 | | 0.3 | | | 152 | 53 | 84 | 0.29 |
| 41 | 0.65 | 0.15 | 0.2 | | | 135 | 53 | 86 | 0.23 |
| 42 | 0.2 | 0.2 | 0.6 | | | 142 | 40 | 81 | 0.29 |
| 43 | 0.8 | 0.1 | | | 0.1 | 126 | 43 | *** | 0.23 |

***These samples were compression molded only; % T not measured

TABLE 3

Examples of Polymer Blends - Molded CDs

| Example | Composition | Melt Temp [° F.] | Mold Temp [° F.] | Tg [° C.] | Percent Transmission | YI | Haze |
|---|---|---|---|---|---|---|---|
| C8 | BPA-PC | 570 | 182 | 142 | 91.1 | 1.4 | 8.4 |
| C9 | BCC-PC | 570 | 182 | 139 | 88.5 | 4.2 | 10.3 |
| C10 | BisAP-PC | 580 | 208 | 182 | 88.2 | 4.6 | 7.5 |
| C11 | 90/10 BPA-PC/PCCD | 575 | 182 | 133 | 89.7 | 2.7 | 10.3 |
| 44 | 90/10 BCC/AMPS | 550 | 180 | 123 | 89.8 | 3.3 | 8 |
| 45 | 80/20 BCC/AMPS | 550 | 180 | 117 | 88.1 | 4.5 | 9.7 |
| 46 | 90/10 BisAP/AMPS | 580 | 208 | 145 | 89.2 | 3.7 | 8.4 |
| 47 | 90/10 BCC/PCCD | 575 | 180 | 128 | 90.1 | 2.8 | 9.9 |
| 48 | 80/20 BCC/PCCD | 550 | 184 | 121 | 90.8 | 2.3 | 9.9 |
| 49 | 70/30 BCC/PCCD | 550 | 171 | 115 | 91 | 2.1 | 9.5 |
| 50 | 76/24 BCC/BisAP | 570 | 182 | 146 | 89.9 | 3.2 | 7.6 |
| 51 | 65/20/15 BCC/BISAP/AMPS | 550 | 180 | 129 | 89.6 | 3 | 8 |

| Example | Composition | Cg [Brewsters] | IBR [nm] Max @ 30 mm | IBR [nm] Min @ 50 mm | IBRmax30-IBRmin50 | Avg(VBR 50, VBR 30) |
|---|---|---|---|---|---|---|
| C8 | BPA-PC | 80 | 34 | −59 | 94 | 663 |
| C9 | BCC-PC | 50 | 18 | −41 | 59 | 538 |
| C10 | BisAP-PC | 53.9 | 30 | −28 | 58 | 372 |
| C11 | 90/10 BPA-PC/PCCD | 73.5 | 17 | −59 | 75 | 601 |
| 44 | 90/10 BCC/AMPS | 44.1 | 20 | −5 | 25 | 319 |
| 45 | 80/20 BCC/AMPS | 35.9 | 13 | 3 | 9 | 260 |
| 46 | 90/10 BisAP/AMPS | 47.2 | 26 | −36 | 62 | 255 |
| 47 | 90/10 BCC/PCCD | 47.1 | 10 | −4 | 13 | 472 |
| 48 | 80/20 BCC/PCCD | 44.2 | 3 | −5 | 9 | 422 |
| 49 | 70/30 BCC/PCCD | 42.4 | 13 | −9 | 22 | 424 |
| 50 | 76/24 BCC/BisAP | 50.9 | 39 | −35 | 74 | 418 |
| 51 | 65/20/15 BCC/BISAP/AMPS | 40.8 | 34 | −12 | 47 | 285 |

Examples 44 and 45 (BCC/AMPS blends) have $C_g$ values of about 44 and 36 brewsters, respectively, well below that for BCC (50 Brewsters) and BPA-PC (80). In addition, the reduced $T_g$, which results in a lower melt viscosity during molding, and the reduced $C_g$, result in a lower birefringence in the molded CD. Example 45 has an IBR between 3 and 13 nm and an average VBR of 260. It is also expected that the lower $T_g$ and melt viscosity would result in improved replication for CDs and especially for more advanced optical media with deeper pit and groove structures such as high density DVD and DVD-recordable and rewriteable formats.

Example 46 (BisAP/AMPS) also has a much reduced VBR (about 255) relative to BPA-PC and BCC. The IBR, though not as low as in Example 45, is still within ±36 nm. Examples 47–49 (BCC/PCCD) have values of IBR within ±15 nm, and average VBR values of about 420–475, well below that of BCC (538), but not quite as good as for the BCC/AMPS blends. The BCC/BisAP blend (Example 50) has a similar average VBR, but a higher IBR range (±40 nm). Finally, the BCC/BisAP/AMPS ternary blend has an IBR range within ±35 nm and an average VBR of 285, well below that of BPA-PC and BCC.

What is claimed is:

1. A miscible polymer blend comprising polymer A and polymer C, wherein (A) is a polycarbonate comprising structural units corresponding to structure (I),

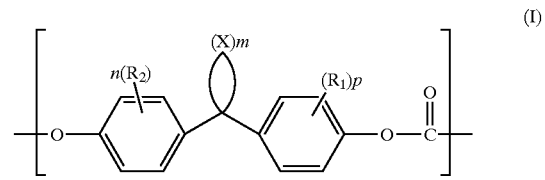

(I)

where $R_1$ and $R_2$ independently comprise a $C_1$–$C_6$ alkyl; X comprises CH; m is an integer from 4 to 7; n is an integer fron 1 to 4; p is an integer from 1 to 4, with the proviso that at least one of $R_1$ or $R_2$ is in the 3 or 3' position, and (C) is a polymer comprising structural units corresponding to structure (III)

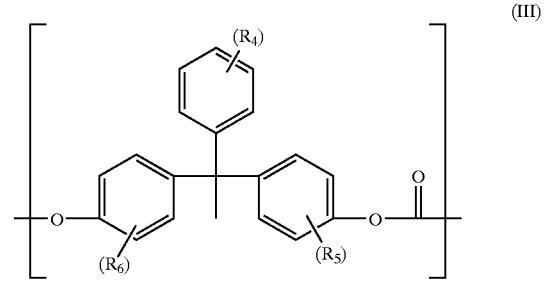

(III)

where $R_4$, $R_5$ and $R_6$ independently comprise a $C_1$–$C_6$ alkyl.

2. The miscible polymer blend as defined in claim 1, wherein (A) is selected to be carbonate structural units of structure (I), the carbonate structural units of structure (I) further selected from the coup consisting of residues of 1,1-bis(4-hydroXy-3-methylphenyl)cyclohexane (BCC); 1,1-bis(4-hydroxy-3-methylphenyl)cyclopentane; 1,1-bis(4-hydroxy-3-methylphenyl)cycloheptane and mixtures thereof.

3. The miscible polymer blend as defined in claim 1, wherein the first polymer (A) comprises from 1 to 99 weight %, and the second polymer (C) comprises from 1 to 99 weight % of the blend.

4. The miscible polymer blend as defined in claim 1, wherein the polymer blend is transparent.

5. An article comprising the miscible polymer blend of claim 1.

6. The article of claim 5, wherein the article is an optical article.

7. The article of claim 5, wherein the article is an optical data storage medium.

8. The article of claim 5, wherein the optical data storage medium comprises a data layer and a transparent overlayer adjacent to the data layer, wherein the transparent overlayer has a thickness of equal to or less than 0.6 mm.

9. The article of claim 5, wherein the optical data storage medium comprises a data layer and a transparent overlayer adjacent to the data layer, wherein the data layer has a thickness of equal to or less than 1.1 mm and the transparent overlayer has a thickness equal to or less than 100 microns.

10. The miscible polymer blend as defined in claim 1, wherein the additive used in optical applications is from 0.0001 to 10% by weight of the blend.

11. A miscible polymer blend comprising polymer A and polymer C, wherein (A) is a polycarbonate comprising structural units corresponding to structure (I),

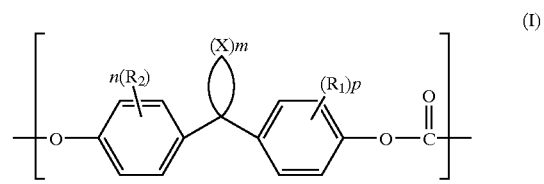

where $R_1$ and $R_2$ independently comprise a $C_1$–$C_6$ alkyl; X comprises $CH_2$; m is an integer from 4 to 7; n is an ininger from 1 to 4; p is an integer from 1 to 4, with the proviso chat at least one of $R_1$ or $R_2$ is in the 3 or 3' position, and (C) is a polymer comprising structural units corresponding to structure (IV)

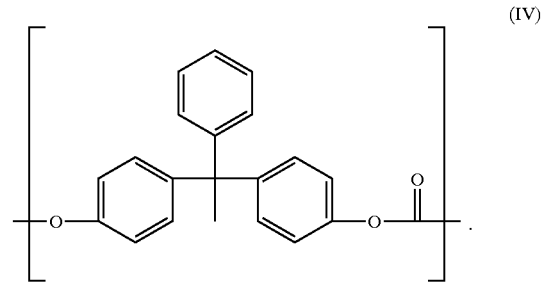

* * * * *